United States Patent [19]
Katori

[11] Patent Number: 5,367,676
[45] Date of Patent: Nov. 22, 1994

[54] DATA PROCESSOR FOR MULTIPLE MACRO-SERVICE PROCESSINGS BASED ON A SINGLE MACRO-SERVICE REQUEST

[75] Inventor: Shigetatsu Katori, Tokyo, Japan
[73] Assignee: NEC Corporation, Tokyo, Japan
[21] Appl. No.: 944,712
[22] Filed: Sep. 11, 1992

Related U.S. Application Data
[63] Continuation of Ser. No. 373,496, Jun. 30, 1989, abandoned.

[30] Foreign Application Priority Data
Jun. 30, 1988 [JP] Japan .................. 63-162970

[51] Int. Cl.$^5$ ............................................. G06F 13/12
[52] U.S. Cl. ...................................... 395/600; 395/775;
395/375; 395/800; 395/725; 364/DIG. 1;
364/230.2; 364/280.8
[58] Field of Search ............... 395/375, 600, 800, 725, 395/775

[56] References Cited

U.S. PATENT DOCUMENTS
| | | | |
|---|---|---|---|
| 4,434,461 | 2/1984 | Puhl | 395/725 |
| 4,930,068 | 5/1990 | Katayose et al. | 364/200 |
| 4,969,090 | 11/1990 | Monson et al. | 364/200 |
| 4,996,639 | 2/1991 | Ishimoto et al. | 364/200 |
| 5,036,458 | 7/1991 | Matsushima | 364/200 |

Primary Examiner—Alyssa H. Bowler
Assistant Examiner—L. Donaghue
Attorney, Agent, or Firm—Foley & Lardner

[57] ABSTRACT

A data processor includes a central processing unit having an execution unit, a program counter for supplying the address of the instruction to be executed and a program status word for holding the execution status of the program, an interrupt request generating means for generating the processing request in asynchronisum with the central processing unit, and interrupt controller receiving the processing request from the interrupt requested generating means and a data memory for storing the processing data. The interrupt request generating means is capable of generating a macro-service request for starting the macro-service processing while saving the contents of the program counter and the program status word. The data memory the control information for starting the macro-service processing and the command information for executing a plurality of macro-service processing. The control information includes a base address for the command information corresponding to the macro-service processing. The interrupt controller response to the macro-service processing request from the interrupt request generating means and outputs a single macro-service request signal to the central processing unit and directly accesses the data memory permitting the central processing unit to operate continuously.

9 Claims, 3 Drawing Sheets

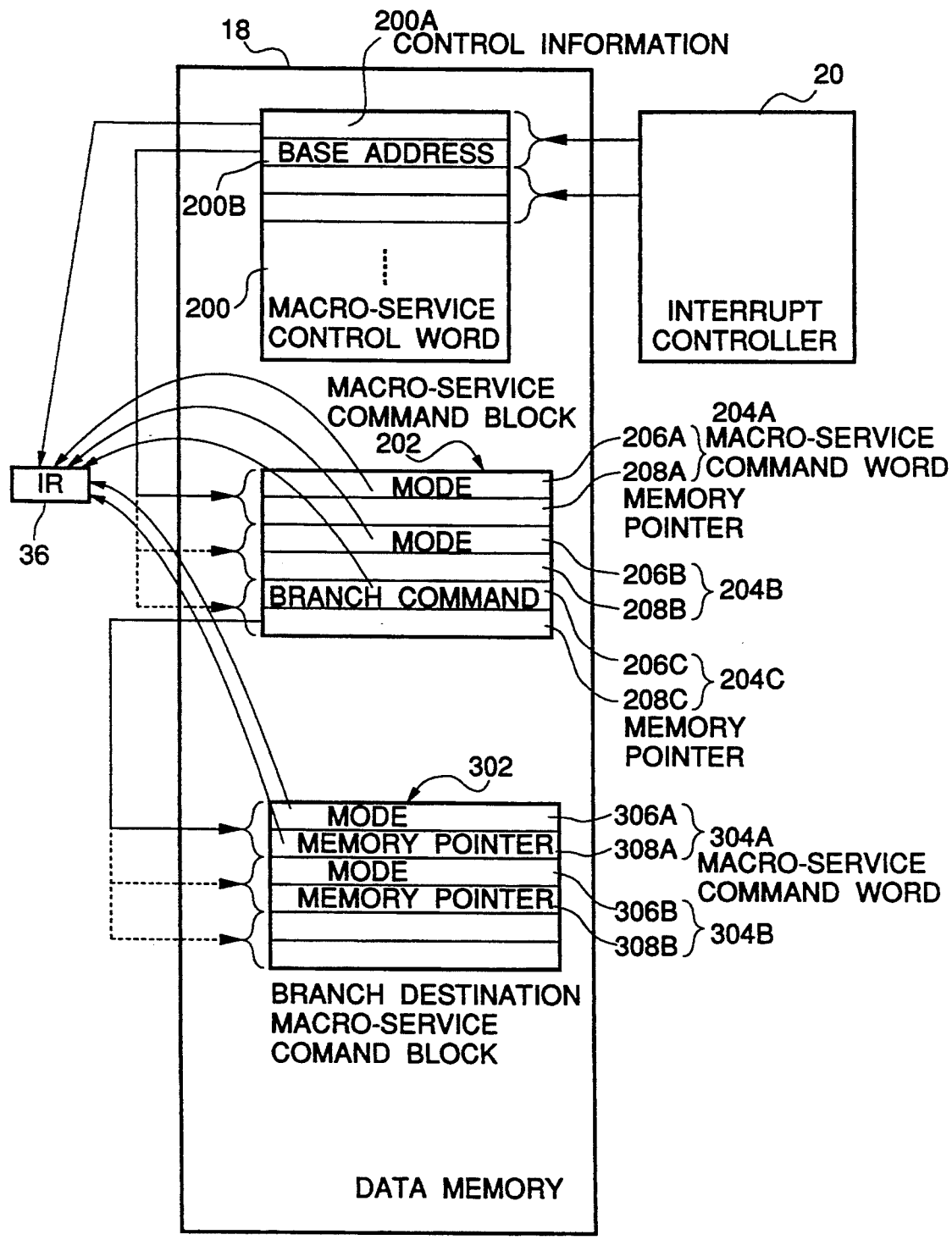

DATA PROCESSOR FOR MULTIPLE MACRO-SERVICE PROCESSINGS BASED ON A SINGLE MACRO-SERVICE REQUEST

This application is a continuation of application Ser. No. 07/373,496, filed Jun. 30, 1989, now abandoned.

BACKGROUND OF THE INVENTION

1. Field of the Invention

The present invention relates to a data processor, and more specifically to improvement of a single chip microcomputer capable of treating a processing request (namely, interrupt request) sent in an asynchronous manner from a device external to a central processing unit (called "CPU" in the specification)

2. Description of Related Art

Data processors including microcomputers are adapted to process a series of data by sequentially reading and executing a program stored in a memory. In response to a processing request other than an ordinary programed processing, the data processors generally operate to acknowledge an interrupt request, and to interrupt execution of a program which is been executed when the interrupt request is received, and further to read and execute a program corresponding to the acknowledged interrupt request.

In conventional data processors, actually, after the interrupt request is sent to the CPU from an external device (namely, an interrupt source), the data processor operates to save contents of a program counter and a program status word, and also to save contents of general purpose registers and initialize the general purpose registers. Thereafter, the data processor starts an interrupt subroutine corresponding to the interrupt request. Accordingly, a long time is consumed after the interrupt request is sent to the CPU until the interrupt program is actually executed. Particularly, the saving of the program counter and the program status word, and the saving and initialization of the general purpose registers are a matter foreign to the data processing required for the interrupt processing. As a result, the interrupt will greatly decrease the data processing capacity of the CPU in the conventional data processor.

SUMMARY OF THE INVENTION

Accordingly, it is an object of the present invention to provide a data processor which has overcome the above mentioned defect of the conventional data processor.

Another object of the present invention is to provide a data processor capable of minimizing the decrease of the processing capacity of the CPU caused by interrupt request processings.

The above and other objects of the present invention are achieved in accordance with the present invention by a data processor comprising a central processing unit having an execution unit, a program counter for supplying an address for an instruction to be executed, and a program status word for holding an execution status of a program; an interrupt request generating means for generating a processing request in asynchronism with the central processing unit; an interrupt controller receiving the processing request from the interrupt request generating means; and a data memory for storing processing data. The interrupt request generating means is capable of selectively generating a first processing request which requests to start a first data processing branching operation to a predetermined address after saving contents of the program counter and the program status word to the data memory, and a second processing request which requests to start a second data processing while maintaining contents of the program counter and the program status word. The data memory stores control information for executing the second data processing. The interrupt controller receives the first and second data processing requests from the interrupt request generating means, and operates to output to the central processing unit an interrupt request signal corresponding to a received processing request. The central processing unit receives the interrupt request signal from the interrupt controller, and operates to interrupt execution of an instruction being executed and to selectively start either the first data processing or the second data processing. Thereafter, the central processing unit operates to start the interrupted instruction execution after the started first or second data processing has been completed. Furthermore, the central processing unit operates to continuously execute the second data processing on the basis of the control information stored in the data memory. In a preferred embodiment, the second data processing is a so-called macro-service, and a series of macro-service processings are sequentially performed on the basis of macro-service control information stored in the data memory.

The above and other objects, features and advantages of the present invention will be apparent from the following description of preferred embodiments of the invention with reference to the accompanying drawings.

BRIEF DESCRIPTION OF THE DRAWINGS

FIG. 3 illustrates a second example of a memory area allocation within the data memory shown in FIG. 1.

DESCRIPTION OF THE PREFERRED EMBODIMENTS

Figure 1:
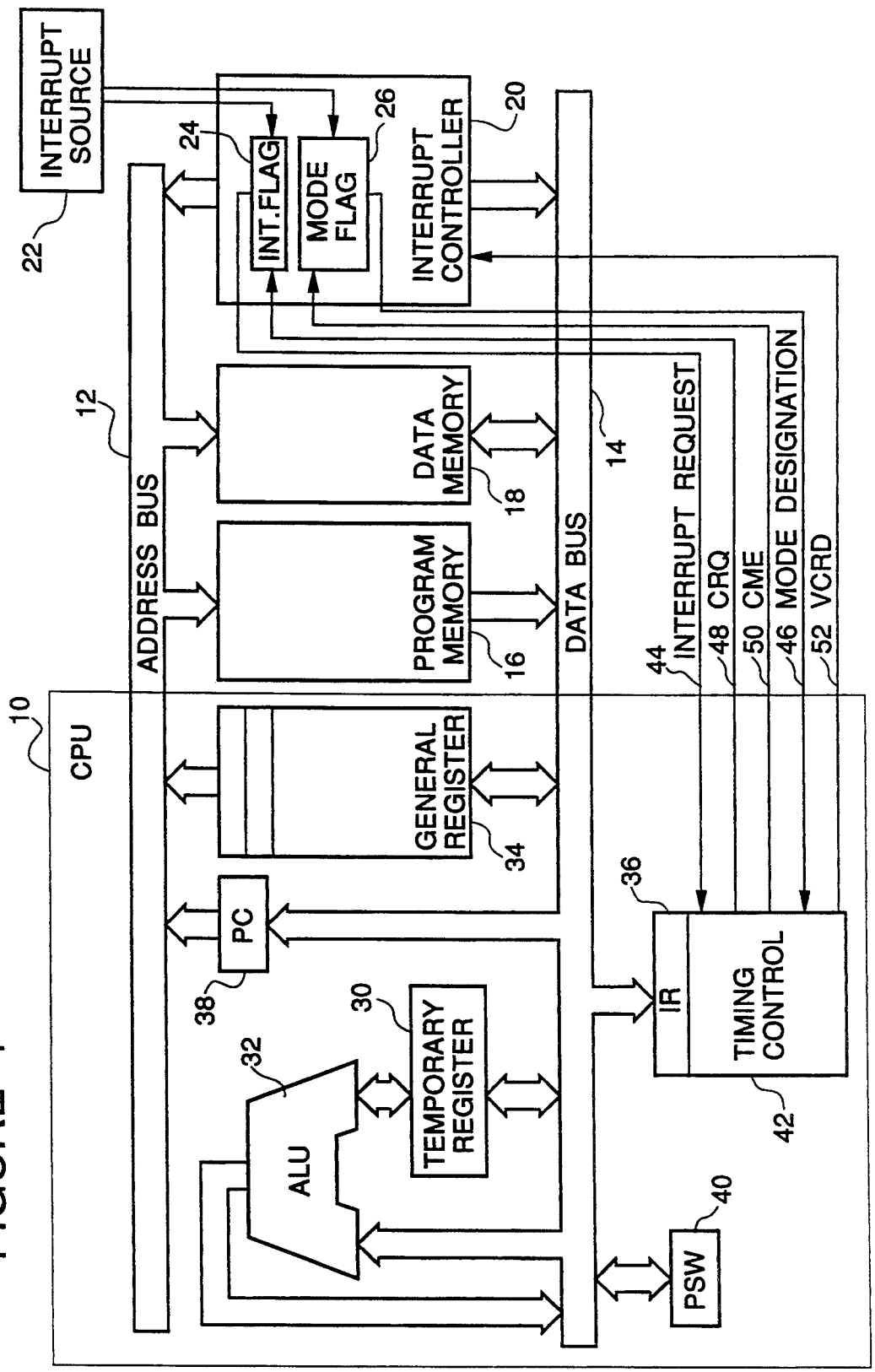
FIG. 1 is a block diagram of an embodiment of the data processor in accordance with the present invention.

Referring to FIG. 1, there is shown a block diagram of an embodiment of the data processor in accordance with the present invention.

The shown data processor includes a CPU 10 having an address bus 12 and a data bus 14 extending therefrom. A program memory 16, a data memory 18 and an interrupt controller 20 are coupled to both the address bus 12 and the data bus 14. The interrupt controller 20 is connected to receive an interrupt request from an interrupt source 22. In most the applications, there are a plurality of interrupt sources. However, in FIG. 1, for simplification of the drawing, all interrupt sources are represented by the single interrupt source 22.

The interrupt controller 20 includes interrupt request flags 24 used for each interrupt request from the interrupt source, and mode designation flags 26 also used for each interrupt request from the interrupt source. When both the interrupt request flag 24 and the mode designation flag 26 are set, the interrupt controller 20 operates to output a macro-service processing request to the CPU 10. On the other hand, when the interrupt request flag 24 is in a set condition but the mode designation flag 26 is in a cleared condition, the interrupt controller 20 operates to output an interrupt processing request to the CPU 10, similar to a conventional data processor.

The interrupt request flag 24 is cleared in response to a CRQ signal explained hereinafter, when the CPU 10 acknowledges the interrupt request. On the other hand, the mode designation flag 26 is cleared in response to a CME signal explained hereinafter. In addition, the interrupt controller 20 outputs an interrupt vector address or a macro-service storing address to the address bus 12 in response to a VCRD signal explained hereinafter.

The interrupt controller 20 also operates to select a request having the highest priority, at each moment, among macro-service requests and interrupt requests from a plurality of interrupt sources, and then to send the highest priority request to the CPU 10.

On the other hand, the CPU 10 includes a temporary register 30, an arithmetic and logic unit (ALU) 32, general purpose registers 34, an instruction register (IR) 36, a program counter (PC) 38, a program status word (PSW) 40, and a timing controller 42, which are coupled to the address bus 12 and the data bus 14 and also coupled to one another, as shown in FIG. 1. Since a basic structure of the CPU itself is well known to persons skilled in the art, a detailed explanation will be omitted, and only parts closely relating to the gist of the present invention will be explained.

The timing controller 42 is connected through lines 44 and 46 to the interrupt request flag 24 and the mode designation flag 26, respectively, and operates to sample the contents of these flags at a final timing of each instruction processing.

Namely, when the timing controller 42 detects that the interrupt request signal 44 is active and the mode designation signal 46 is at a low level, the timing controller 42 controls to the effect that contents of at least the PSW 40 and the PC 38, and if necessary, the general purpose registers 34 are saved in the data memory 18, and thereafter, an operation branching to a predetermined interrupting vector is executed. On the other hand, when the timing controller 42 detects that the interrupt request signal 44 is active and the mode designation signal 46 is at a high level, the timing controller 42 controls to execute the macro-service processing while maintaining the contents of the PSW 40, the PC 38 and the general purpose registers 34.

Furthermore, the timing controller 42 outputs the CRQ signal 48 and the CME signal 50 to the interrupt request flag 24 and the mode designation flag 26, respectively. The timing controller also outputs the VCRD signal 52 to the interrupt controller 20.

As is well known, the program memory 16 stores various programs to be executed by the CPU 10, and the data memory 18 can store a number of items of processing data. In addition, the data memory 18 stores a control data block for realizing the control in accordance with the present invention.

Now, an operation of the above mentioned data processor will be explained.

In a normal operation, the CPU 10 operates in a such a manner that the content of the PC 38 is outputted to the address bus 12, and an instruction code is read from a designated address location of the program memory 16 through the data bus 14 to the instruction register 36. The timing controller 42 then controls the operation timings of various hardwares including the ALU 32, the general purpose registers 34, etc.

Furthermore, the timing controller 42 causes to increment the PC 38 by one instruction code word length in order to generate an address for reading the next instruction code. At a final timing of the instruction processing, the timing controller 42 samples the interrupt request signal 44. If the interrupt request is not detected, the timing controller 42 controls to cause the content of the PC 38 to be outputted to the address bus 12, so that an instruction code is read from the program memory 16.

If the interrupt request is detected, the processor operates as follows:

If the timing controller 42 detects at a final timing of the instruction processing that the interrupt request signal 44 is active and the mode designation signal 46 is at the low level, the timing controller 42 controls to forcibly set the instruction register 36 with a normal interrupt processing code, so that the processor goes into an interrupt processing. In this interrupt processing, the timing controller 42 causes the contents of the PC 38 and the PSW 40 to be saved to the data memory 18 through the data bus 14. Thereafter, the timing controller 42 activates the VCRD signal 52 for reading an interrupt vector. In response to the activated VCRD signal 52, the interrupt controller 20 outputs an interrupt vector information to the address bus 12, and on the other hand, the timing controller controls to the effect that the vector on the address bus 12 is read out and written to the PC 38. With this, a program is branched to the vector address, and execution of the interrupt processing routine is started.

On the other hand, if the timing controller 42 detects at a final timing of the instruction processing that the interrupt request signal 44 is active and the mode designation signal 46 is at the high level, the timing controller 42 controls to forcibly set the instruction register 36 with a macro-service processing code, so that the processor goes into a macro-service processing.

This macro-service is a featured function of the data processor in accordance with the present invention. In order to execute the macro-service, the data memory 18 previously stores the control information as shown in FIG. 2, which illustrates one example of the data memory allocation.

Figure 2:
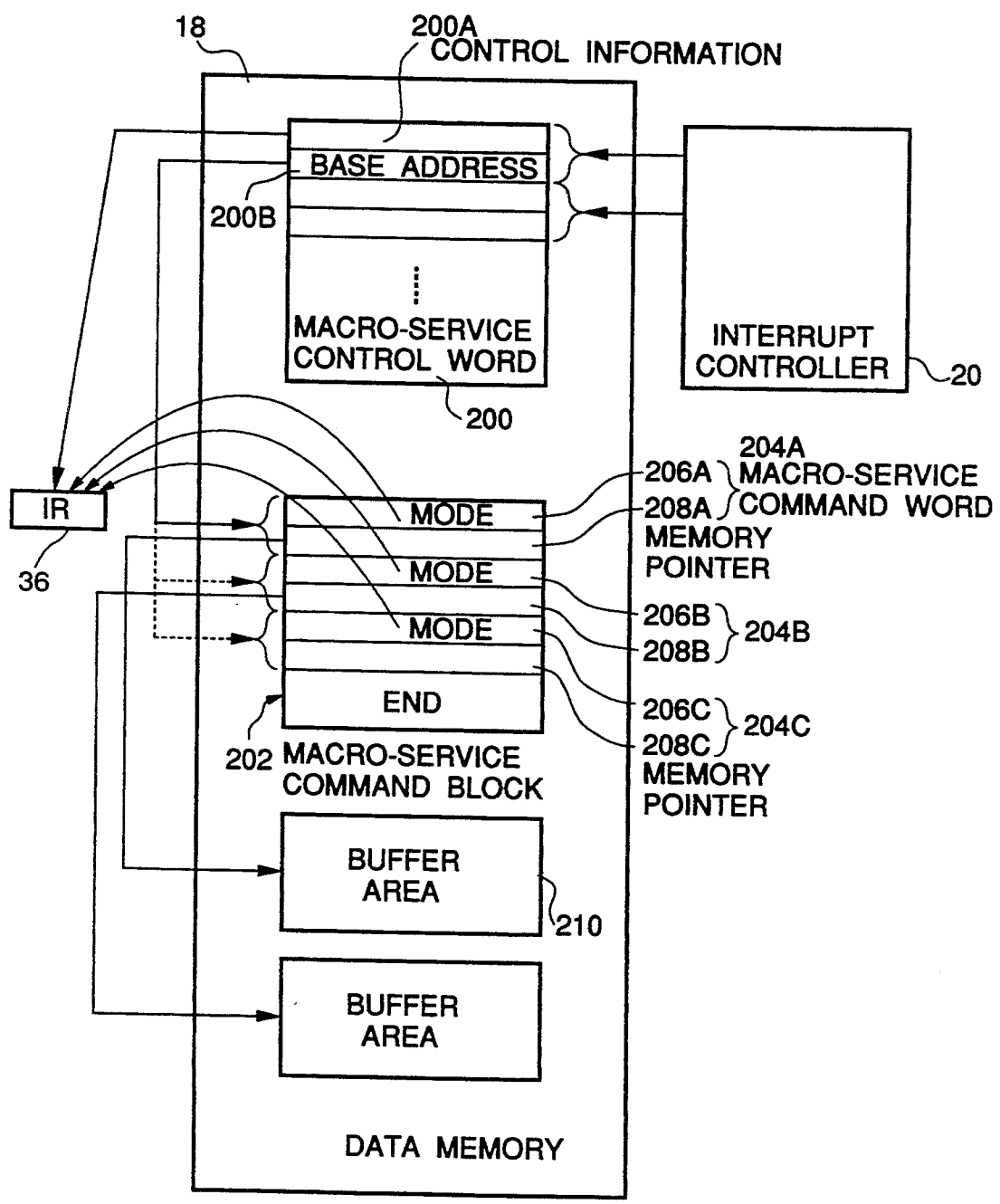
FIG. 2 illustrates a first example of a memory area allocation within the data memory shown in FIG. 1.

As shown from FIG. 2, macro-service control words 200 of the number corresponding to the number of required macro-services are set in the data memory 18. A macro-service control word for each macro-service is composed of two bytes including a control information 200A and a base address 200B for a macro-service command word explained hereinafter. In addition, as seen from FIG. 2, the macro-service control word 200 is directly addressed and designated by the interrupt controller 20 in response to the acknowledged macro-service request.

On the other hand, there is provided a macro-service command block 202 including a plurality of macro-service command words 204 (204A, 204B, 204C, . . . ). The macro-service command word 204 for each macro-service processing is composed of two bytes including a macro-service mode information 206 (206A, 206B, 206C, . . . ) and a memory pointer information 208 (208A, 208B, 208C, . . . ). The base address for the macro-service command block 202 is designated by the base address information 200B included in each macro-service control word 200. On the other hand, the memory pointers 208 designate an address of a buffer area within the data memory 18 used for the macro-service.

Thus, when the timing controller 42 detects that the interrupt request signal 44 is active and the mode designation signal 46 is at the high level, a macro-service processing is executed in the following procedures:

(1-1) The timing controller 42 activates the VCRD signal 52. In response to the active VCRD signal 52, the interrupt controller 20 outputs a macro-service control word storing address of the data memory 18 to the address bus 12.

(1-2) The timing controller 42 controls to read a macro-service control word 200 from the data memory 18 on the basis of the macro-service control word storing address outputted onto the address bus 12. The control information 200A within the macro-service control word 200 is transferred to the instruction register 36, and the timing controller 42 starts an initialization for the macro-service, which will be explained below.

(2-1) On the basis of the control information set in the instruction register 36, the timing controller 42 controls to the effect that the base address 200B included in the macro-service control word 200 is stored in the temporary register 30, and also is outputted to the address bus 12 so that a macro-service mode information 206A is read from the macro-service command word 204A within the macro-service command block 202 of the data memory.

(2-2) Thus, a predetermined macro-service processing is started by setting the macro-service mode information 206A to the instruction register 36.

Here, the macro-services can be exemplified by a data transfer between the interrupt source which generates the macro-service request and a buffer area 210 within the data memory 18 designated by the memory pointer information 208A of the macro-service command word 204A, the data transfer being executed while maintaining the contents of the PSW 40, the PC 38 and the general purpose registers 34 as they are.

After one macro-service processing has been completed, the following processing is performed for preparation of a next macro-service processing.

(3-1) The base address information 200B for the macro-service command block stored in the temporary register 30 is updated (or incremented) by one word, and a new macro-service mode information 206B included in the macro-service command block 202 and corresponding to the updated base address is read out.

(3-2) A next macro-service processing is started by setting the newly read-out macro-service mode information 206B to the instruction register 36.

As seen from the above, a series of macro-service processings are continuously executed by the reading and execution of a sequence of macro-service mode information 206 from the macro-service command block 202, so that the above steps (3-1) and (3-2) are repeated. As the result of the reading and execution of a sequence of macro-service mode information 206, if an end code is read as the macro-service mode information, it goes to a termination processing of the series of macro-service processings. Namely, the termination processing for the macro-service processings is executed as follows by setting the macro-service end code to the instruction register 36 in the step (3-2)

(4-1) In order to notify the termination of the macro-service to the interrupt controller 20, the timing controller 42 activates the CRQ signal 48 so as to clear the corresponding interrupt flag 24.

(4-2) The timing controller 42 activates the CME signal 50 in accordance with the type of the macro-service processing, so that the mode designation flag 26 is cleared, while maintaining the interrupt flag 24 in the set condition. In this case, since the interrupt request is maintained even after the required macro-service processing has been completed, the CPU 10 starts the interrupt processing.

Referring to FIG. 3, there is shown a second example of the data memory allocation, which can realize another embodiment of the data processor in accordance with the present invention. The second embodiment is realized by using the data processor shown in FIG. 1. In addition, in FIG. 3, codes and area corresponding to those shown in FIG. 2 are given the same Reference Numerals, and explanation thereof will be omitted.

As seen from comparison between FIGS. 2 and 3, the second example shown in FIG. 3 is such that a branch command is positioned as a final data of the macro-service command block 202 within the data memory 18. Otherwise, the two examples are the same.

Therefore, the timing controller 42 of the CPU operates in the same manner as the first embodiment, with respect to the detection of the macro-service request and the interrupt request, and the starting condition for the macro-service processing and the interrupt processing. In addition, the acknowledging operation for the macro-service request and the reading of the macro-service command word from the macro-service command block are executed as follows, similarly to those of the first embodiment.

(3-1) The base address information 200B for the macro-service command block stored in the temporary register 30 is updated (or incremented) by one word, and a new macro-service mode information 206B included in the macro-service command block 202 and corresponding to the updated base address is read out.

(3-2) A next macro-service processing is started by setting the newly read-out macro-service mode information 206B to the instruction register 36.

As seen from the above, a series of macro-service processings are continuously executed by the reading and execution of a sequence of macro-service mode information 206 from the macro-service command block 202. However, if a branch command is read out, a processing for the branch command is executed as follows:

(4-1) A branch command information 206C included in the macro-service command block 202 is read out, and then, set to the instruction register 36.

(4-2) On the basis of the branch command information set in the instruction register 36, the timing control circuit 42 controls to read the address information 208C for a branch destination or new macro-service command block 302.

(4-3) From the new macro-service command block 302, there is read a macro-service command word 304A, and a macro-service mode information 306A included in the read-out macro-service command word 304A is set to the instruction register 36. With this, a series of macro-service processing defined by the new macro-service command block 302 is started.

Thus, the macro-service command words 304A, 304B, . . . are sequentially read out, and the above steps (3-1) and (3-2) are repeated. As a result, the macro-service processings defined in a plurality of macro-service control blocks are continuously performed. Finally, similar to the first embodiment, the terminating processing for the macro-service is performed by setting a macro-service end code to the instruction register 36, and then, after the series of macro-service processings are completed, the operation goes into the normal instruction processing.

As seen from the above explanation, the data processor in accordance with the present invention is such that a plurality of macro-service control commands for starting a required number of macro-services can be set within the macro-service command block in the data memory. Therefore, a plurality of required programmable macro-services can be executed with a single macro-service request.

Furthermore, the data processor in accordance with the present invention can continuously executes a series of macro-services, without saving the execution environment including the PSW and the PC, and also without initializing the execution environment. Therefore, it is possible to decrease the processing capacity of the CPU when an interrupt is generated.

The invention has thus been shown and described with reference to the specific embodiments. However, it should be noted that the present invention is in no way limited to the details of the illustrated structures but changes and modifications may be made within the scope of the appended claims.

I claim:

1. A data processor, comprising:
   an address bus and a data bus;
   a program memory coupled to said address bus and said data bus;
   a central processing unit also coupled to said address bus and said data bus, said central processing unit having:
   a program counter, coupled to said address bus and said data bus for supplying an address of an instruction to be executed through said address bus to said program memory, said program counter being set through said data bus,
   a program status word, coupled to said data bus for holding an execution status of a program,
   a temporary register coupled to said data bus,
   an execution unit, coupled to said data bus and said temporary register for processing the data supplied through at least one of said data bus and said temporary register and executing said instruction,
   an instruction register, coupled to said data bus for receiving and holding an instruction which is read from said program memory and supplied through said data bus, and
   a timing controller, coupled to said instruction register, for generating a plurality of control signals;
   at least one interrupt request source for generating an interrupt processing request in asynchronism with said central processing unit;
   an interrupt controller, coupled to said address bus and said data bus, said interrupt controller receiving said interrupt processing request from said at least one interrupt request source, said interrupt controller including
   an interrupt flag, set by said at least one interrupt request source, for outputting an active interrupt request signal to said timing controller whenever said interrupt flag is in a set condition, and
   a mode flag set whenever said interrupt processing request is processed by a macro-service processing which is executed by said central processing unit without saving the contents of said program counter and said program status word,
   said mode flag outputting an active mode designation signal to said timing controller whenever said mode flag is in a set condition; and
   a data memory, coupled to said address bus and said data bus, for storing processing data and supplying the stored processing data through said data bus to said central processing unit,
   said data memory storing a series of macro-service control words, each for starting a series of macro-service processings, each of said macro-service control words capable of being directly addressed and designated by said interrupt controller,
   and said data memory storing a series of command information, each for executing a corresponding one of said series of macro-service processings, each of said macro-service control words including a control information and a base address for a first command information of said series of command information,
   wherein in response to said active interrupt request signal and said active mode designation signal, said timing controller controls and forces the processor to be in a macro-service processing in such a manner that, one macro-service control word stored in said data memory is designated by said interrupt controller and the control information included in said designated macro-service control word is read out and registered in said instruction register, and said base address included in said designated macro-service control word is read out and registered in said temporary register, and a command information stored at said base address in said data memory is read out and registered in said instruction register,
   whereby a first macro-service processing is executed by said execution unit, and when execution of said first macro-service processing is completed, said temporary register is updated so as to update said base address, and a command information stored at said updated base address in said data memory is read out and registered in said instruction register,
   and whereby a second macro-service processing is continuously executed by said execution unit without requiring a macro-service request for said second macro-service.

2. A data processor claimed in claim 1 wherein a plurality of macro-service command blocks are formed in said data memory, and a base address for each of said macro-service command blocks is designated by said base address included in a corresponding one of said macro-service control words, each of said macro-service command blocks including a plurality of macro-service command words for each one of said macro-service processings, each of said macro-service command words including a macro-service mode information to be registered in said instruction register so that a corresponding macro-service processing is executed by said execution unit, and a memory pointer information which designates an address of a buffer area within said data memory used for execution of said corresponding macro-service processing,
   whereby a series of macro-service processings are continuously executed by the reading and execution of a sequence of macro-service mode information from the macro-service command blocks without requiring a macro-service request for each of said macro-service.

3. A data processor claimed in claim 2, wherein if an end code is read as the macro-service mode information, a macro-service end code is set in said instruction register, and said timing controller generates an active clear signal to said interrupt flag, and clears said mode designation flag in accordance with the type of the macro-service processing executed, such that the series of said macro-service processings is terminated.

4. A data processor claimed in claim 2, wherein if a branch command information is read out as the macro-service mode information, said branch command information is set in said instruction register, and based on the branch command information set in said instruction register, said timing controller controls to read an address information for a new macro-service command block, so that a new macro-service command word is read out from said new macro-service command block, and a new macro-service mode information included in the read-out new macro-service command word is set to said instruction register, and whereby a series of macro-service processings defined by said new macro-service command block are started.

5. A data processor, comprising:
a central processing unit coupled to an address bus and a data bus, said central processing unit including a program counter, a program status word, a temporary register coupled to said data bus, an instruction register, and a timing controller coupled to said instruction register, said timing controller generating control signals;
an interrupt controller, coupled to said address bus and said data bus, said interrupt controller receiving an interrupt processing request from at least one interrupt request source, said interrupt controller accessing a data memory, said interrupt controller including,
(1) an interrupt flag, set by said at least one interrupt request source, said interrupt controller outputting an active interrupt request signal to said timing controller whenever said interrupt flag is in a set condition, and
(2) a mode flag set whenever said interrupt processing request is processed by a macro-service processing, said macro-service processing being executed by said central processing unit without saving the contents of said program counter and said program status word, said interrupt controller outputting an active mode designation signal to said timing controller whenever said mode flag is in a set condition;
a plurality of macro-service control words stored in a data memory, each of said macro-service control words used for starting a series of macro-service processings, each of said macro-service control words including control information and a base address;
a plurality of macro-service command blocks formed in said data memory, each of said command blocks executing a corresponding one of said series of macro-service processings, said base address in each of said macro-service control words pointing to a corresponding command block, each of said macro-service command blocks including a plurality of macro-service command words for each one of said macro-service processings, each of said macro-service command words including,
(1) a macro-service mode information to be registered in said instruction register so that a corresponding macro-service processing is executed by said central processing unit,
(2) a memory pointer information which designates an address of a buffer area within said data memory used for execution of said corresponding macro-service processing,
wherein in response to both of said interrupt request signal and said mode designation signal being active, said timing controller controls said central processing unit to execute a macro-service processing, one macro-service control word stored in said data memory being designated by said interrupt controller and the control information included in said designated macro-service control word being read out and stored in said instruction register, and said base address included in said designated macro-service control word being read out and stored in said temporary register and a first macro-service mode information stored at said base address in said data memory is read out and stored in said instruction register, whereby a first macro-service processing is executed by said central processing unit, and when execution of said first macro-service processing is completed, said temporary register is updated so as to update said base address, and a second macro-service mode information stored at said updated base address in said data memory is read out and stored in said instruction register, and whereby a second macro-service processing is executed by said central processing unit without requiring a macro-service request for said second macro-service processing.

6. A data processor as claimed in claim 5, wherein upon reading of an end code as the macro-service mode information, a macro-service end code is set in said instruction register, and said timing controller generates an active clear signal to said interrupt flag, and clears said mode designation flag in accordance with the type of the macro-service processing executed, thereby terminating the series of said macro-service processings.

7. A data processor as claimed in claim 5, wherein upon reading a branch command information as the macro-service mode information, said branch command information is set in said instruction register, and based on the branch command information set in said instruction register, said timing controller controls to read an address information for a new macro-service command block, so that a new macro-service command word is read out from said new macro-service command block, and a new macro-service mode information included in the read-out new macro-service command word is set to said instruction register, and whereby a series of macro-service processings defined by said new macro-service command block are started.

8. A method for executing in a data processor a series of macro-service processings in response to a single macro-service request in a data processor, said data processor including a central processing unit coupled to an address bus and a data bus, said central processing unit including a program counter, a program status word, a temporary register coupled to said data bus, an instruction register, and a timing controller, coupled to said instruction register, for generating a plurality of control signals, and an interrupt controller, said method for executing comprising the steps of:
receiving an interrupt processing request from at least one interrupt request source;

setting an interrupt flag by said at least one interrupt request source and outputting an active interrupt request signal to said timing controller from said interrupt controller whenever said interrupt flag is in a set condition;

setting a mode flag whenever said interrupt processing request is processed by a macro-service processing and outputting an active mode designation signal to said timing controller from said interrupt controller whenever said mode flag is in a set condition;

storing a plurality of macro-service control words stored in a data memory, each of said macro-service control words for starting a series of macro-service processings, each of said macro-service control words including control information and a base address;

storing a plurality of macro-service command blocks in said data memory, each of said macro-service command blocks including a plurality of macro-service command words for each one of said macro-service processings, each of said command blocks for executing a corresponding one of said series of macro-service processings, each of said macro-service command words including a macro-service mode information to be registered in said instruction register so that a corresponding macro-service processing is executed by said central processing unit and a memory pointer information which designates an address of a buffer area within said data memory used for execution of said corresponding macro-service processing;

controlling said central processing unit to execute a macro-service processing in response to both of said interrupt request signal and said mode designation signal being active;

reading out said control information included in a macro-service control word designated by said interrupt controller and storing said control information in said instruction register, reading out said base address included in said designated macro-service control word and storing said base address in said temporary register;

reading out a first macro-service mode information stored at said base address in said data memory and registering said first macro-service mode information in said instruction register;

executing first macro-service processing by said central processing unit according to said first macro-service mode information;

updating said temporary register when execution of said first macro-service processing is completed, so as to update said base address; and reading out second macro-service mode information stored at said updated base address in said data memory and registering it in said instruction register, whereby a second macro-service processing is executed by said central processing unit without requiring a macro-service request for said second macro-service.

9. The method as recited in claim 8, further comprising the steps of:

registering a macro-service end code in said instruction register upon reading of an end code as the macro-service mode information;

generating an active clear signal to said interrupt flag in said timing controller; and clearing said mode designation flag in accordance with the type of the macro-service processing executed, thereby terminating the series of said macro-service processings.

* * * * *